(12) United States Patent
Zhao et al.

(10) Patent No.: US 7,415,278 B2
(45) Date of Patent: Aug. 19, 2008

(54) METHOD AND SYSTEM FOR CREATING AND DEPLOYING A MESH NETWORK

(75) Inventors: Fuyong Zhao, San Jose, CA (US); Xiadong Wang, Saratoga, CA (US); Fang Wu, Pleasanton, CA (US)

(73) Assignee: Azalea Networks (KY)

( * ) Notice: Subject to any disclaimer, the term of this patent is extended or adjusted under 35 U.S.C. 154(b) by 9 days.

(21) Appl. No.: 11/202,258

(22) Filed: Aug. 10, 2005

(65) Prior Publication Data

US 2006/0089148 A1   Apr. 27, 2006

Related U.S. Application Data

(60) Provisional application No. 60/622,223, filed on Oct. 27, 2004.

(51) Int. Cl.
*H04Q 7/20* (2006.01)
(52) U.S. Cl. ......... 455/447; 455/446; 455/450; 455/509; 370/329
(58) Field of Classification Search .......... 455/428, 455/445–453, 450–452.2, 509–511, 434, 455/560–561, 464, 507, 524, 426.2, 554.2; 370/328–329, 341, 254, 310–310.2, 338, 370/348
See application file for complete search history.

(56) References Cited

U.S. PATENT DOCUMENTS

| | | | |
|---|---|---|---|
| 5,970,412 A | 10/1999 | Maxemchuk | |
| 6,002,935 A | 12/1999 | Wang | |
| 6,023,459 A * | 2/2000 | Clark et al. | 370/329 |
| 6,088,570 A * | 7/2000 | Komara et al. | 455/11.1 |
| 6,088,592 A | 7/2000 | Doner et al. | |
| 6,091,951 A * | 7/2000 | Sturniolo et al. | 455/432.2 |
| 6,298,053 B1 * | 10/2001 | Flammer et al. | 370/349 |
| 6,522,885 B1 * | 2/2003 | Tang et al. | 455/447 |
| 6,542,746 B1 * | 4/2003 | Dean | 455/447 |
| 6,775,549 B2 | 8/2004 | Benveniste | |
| 6,996,086 B2 | 2/2006 | Wolfe et al. | |
| 6,996,374 B1 * | 2/2006 | Bao et al. | 455/67.11 |
| 7,031,266 B1 * | 4/2006 | Patel et al. | 370/254 |
| 7,136,655 B2 * | 11/2006 | Skafidas et al. | 455/450 |
| 7,164,667 B2 | 1/2007 | Rayment et al. | |
| 7,171,223 B2 | 1/2007 | Herscovich et al. | |
| 2002/0159409 A1 * | 10/2002 | Wolfe et al. | 370/329 |
| 2003/0050067 A1 * | 3/2003 | Rozmaryn | 455/447 |
| 2004/0157613 A1 * | 8/2004 | Steer et al. | 455/446 |

(Continued)

OTHER PUBLICATIONS

U.S. Appl. No. 60/421,930, filed Oct. 28, 2002, da Costa, Francis, pp. 1-11 and Figs. 1-9.*

(Continued)

*Primary Examiner*—Kamran Afshar
(74) *Attorney, Agent, or Firm*—Orrick, Herrington & Sutcliffe LLP

(57) ABSTRACT

A method and system for creating and deploying a mesh network are disclosed. In one embodiment, the method comprises providing a mesh router having a plurality of radios. The mesh router is used in a cell of a plurality of cells that covers a geographic region. Channels are assigned to the plurality of radios. The channels are selected from a plurality of channels to allow channel reuse throughout the plurality of cells.

22 Claims, 9 Drawing Sheets

U.S. PATENT DOCUMENTS

2004/0235484 A1* 11/2004 Korpela et al. .............. 455/446
2005/0094585 A1* 5/2005 Golden et al. .............. 370/310
2005/0192037 A1* 9/2005 Nanda et al. ................ 455/509
2005/0208949 A1* 9/2005 Chiueh .................... 455/452.2
2006/0133404 A1* 6/2006 Zuniga et al. ............... 370/437
2006/0234701 A1* 10/2006 Wang et al. .............. 455/432.1
2006/0268803 A1* 11/2006 Lee et al. ................... 370/338
2007/0127503 A1* 6/2007 Zhao ......................... 370/400

OTHER PUBLICATIONS

International Search Report and Written Opinion, Oct. 24, 2006.
U.S. Appl. No. 60/554,246, filed Mar. 17, 2004.

* cited by examiner

METHOD AND SYSTEM FOR CREATING AND DEPLOYING A MESH NETWORK

The present application claims the benefit of and priority to U.S. Provisional Patent Application No. 60/622,223 entitled "Cellular Mesh Architecture," and filed on Oct. 27, 2004, and is hereby, incorporated by reference.

FIELD OF THE INVENTION

The field of the invention relates generally to wireless networks and more particularly relates to a method and system for creating and deploying a mesh network.

BACKGROUND

High speed and high performance network access are needed in many areas where wired infrastructure is non-existent, outdated, or impractical. Fixed wireless broadband networks can fulfill this need. However, use of existing fixed wireless broadband technology is limited due to a combination of technological constraints and high deployment costs. For example, Wireless Local Area Network (WLAN) technology requires multiple access points where each access point must be connected via cable to a wired backbone infrastructure. As a result, the network becomes difficult and costly to deploy.

To address these problems, wireless mesh network architecture has been studied as a system for becoming part of the network infrastructure and providing wireless access to users. However, wireless mesh networking is limited by its network capacity due to the requirement that nodes forward each others' packets. For example, a uniform random network with random traffic pattern has an end-to-end throughput of $1/n^{1/2}$, where n is the total number of nodes. Therefore, throughput approaches zero as the number of nodes increase.

There are two fundamental reasons that result in diminished throughput. First, current 802.11 Media Access Control (MAC) protocol is inefficient and unfair in multi-hop environments. For example, 802.11 radios cannot transmit and receive at the same time; 802.11 MAC protocol does not correctly solve hidden terminal problems in a mesh; and Request to Send (RTS)/Clear to Send (CTS) scheduling along a multi-hop chain can cause Transmission Control Protocol (TCP) fairness problems and back-off inefficiencies. Second, only a small portion of the available spectrum is used. For example, 802.11b/g has three non-overlapping channels and 802.11a has twelve non-overlapping channels, but 802.11 is designed to use only a single channel frequency at any given time.

In the past, one possible solution was to improve the 802.11 MAC layer. However, this would require changes to the MAC and hardware, which would be expensive and take a significant amount of time to complete.

Alternatively, network capacity can be increased by using multiple radios and multiple channels. For example, a link layer protocol called the Multi-radio Unification Protocol (MUP) has been proposed to coordinate the operation of multiple wireless network cards tuned to non-overlapping frequency channels. However, there is inefficient use of available frequencies because all the nodes in the network use the same fixed channels to talk to their neighbors. As a result, no frequency reuse is available. Furthermore, same-radio packet relay, or the inability to transmit and receive packets at the same time, cannot be completely avoided.

SUMMARY

A method and system for creating and deploying a mesh network are disclosed. In one embodiment, the method comprises providing a mesh router having a plurality of radios. The mesh router is used in a cell of a plurality of cells that covers a geographic region. Channels are assigned to the plurality of radios. The channels are selected from a plurality of channels to allow channel reuse throughout the plurality of cells.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
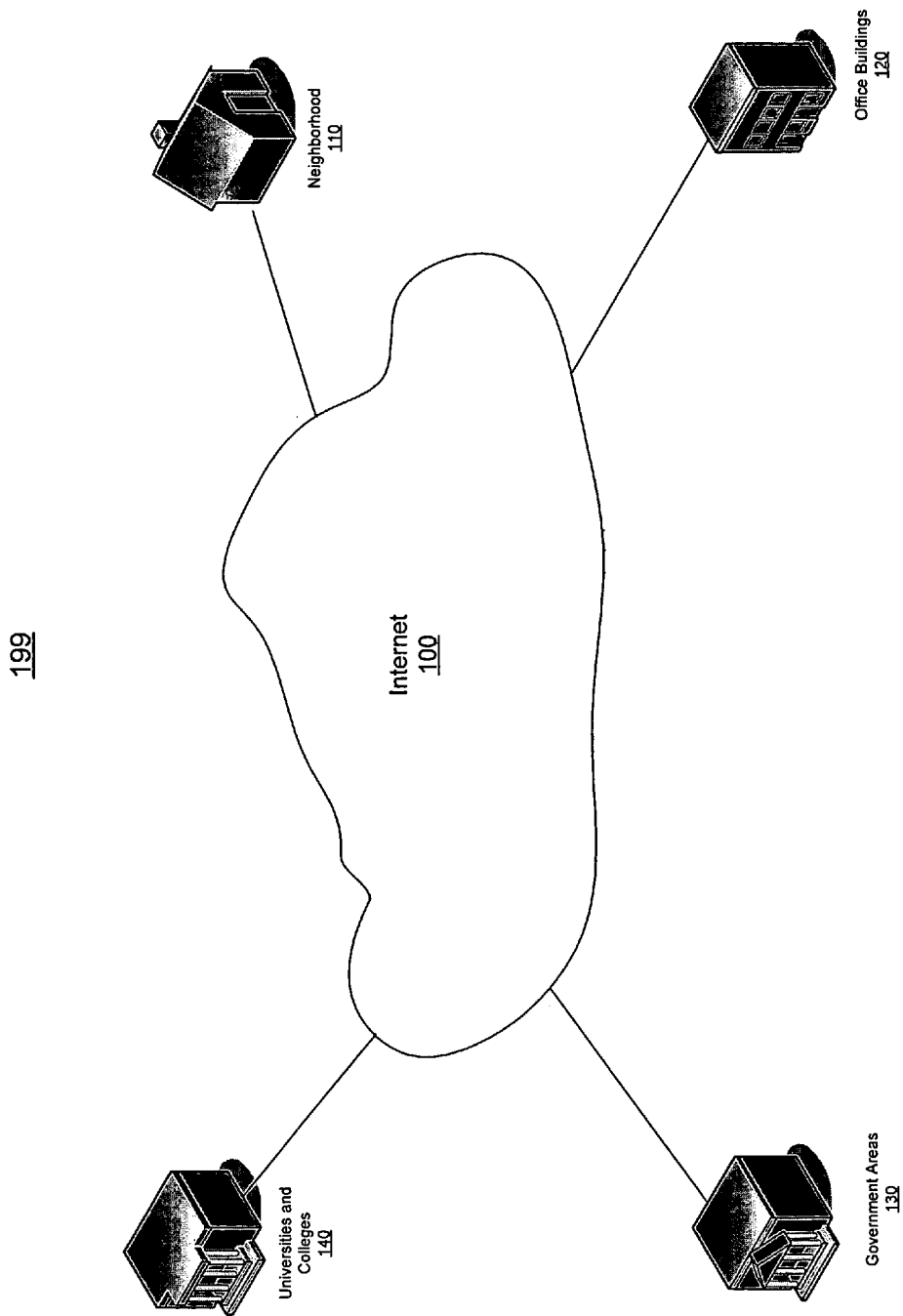
FIG. 1 illustrates a block diagram of a prior art network.

A method and system for creating and deploying a mesh network are disclosed. In one embodiment, the method comprises providing a mesh router having a plurality of radios. The mesh router is used in a cell of a plurality of cells that covers a geographic region. Channels are assigned to the plurality of radios. The channels are selected from a plurality of channels to allow channel reuse throughout the plurality of cells.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of wireless networks and computer systems. These wireless network descriptions and representations are the means used by those skilled in the wireless networking arts to most effectively convey the substance of their work to others skilled in the art. A wireless network is here, and generally, conceived to be a system for communications among two or more computers using radio waves as its carrier. Usually, though not necessarily, the information communicated between computer systems takes the form of packets. Furthermore, for reasons of common usage, the components of the packets are referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "router" or "radio" or "frequency" or "channel" or "backbone" or "packet" or "communicate" or the like, refer to the components, and actions and processes of a network, or similar communication system, that transfers data represented as physical (electronic) quantities within the computer system's registers and memories or other such information storage, transmission or display device from one computer system to another.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of a prior art network 199. In FIG. 1, the Internet 100 is connected to a variety of networks, any of which may be wireless networks. For example wireless networks may cover a neighborhood 110, office buildings 120, government areas 130, and/or universities and colleges 140. The Internet 100 may be a system of interconnected computer networks, local area networks, wide area networks, virtual private networks, or other networks that are configured to transmit data by packet switching using standardized protocols, such as Internet Protocol. Interconnected computer networks facilitate the transfer of information and services, which may include electronic mail, file sharing, and access to the World Wide Web. The various networks 110-140 may have any of a variety of wireless architectures—for example: a wireless local area network, wireless metropolitan area network, wireless wide area network, or other similar wireless network.

Figure 2:
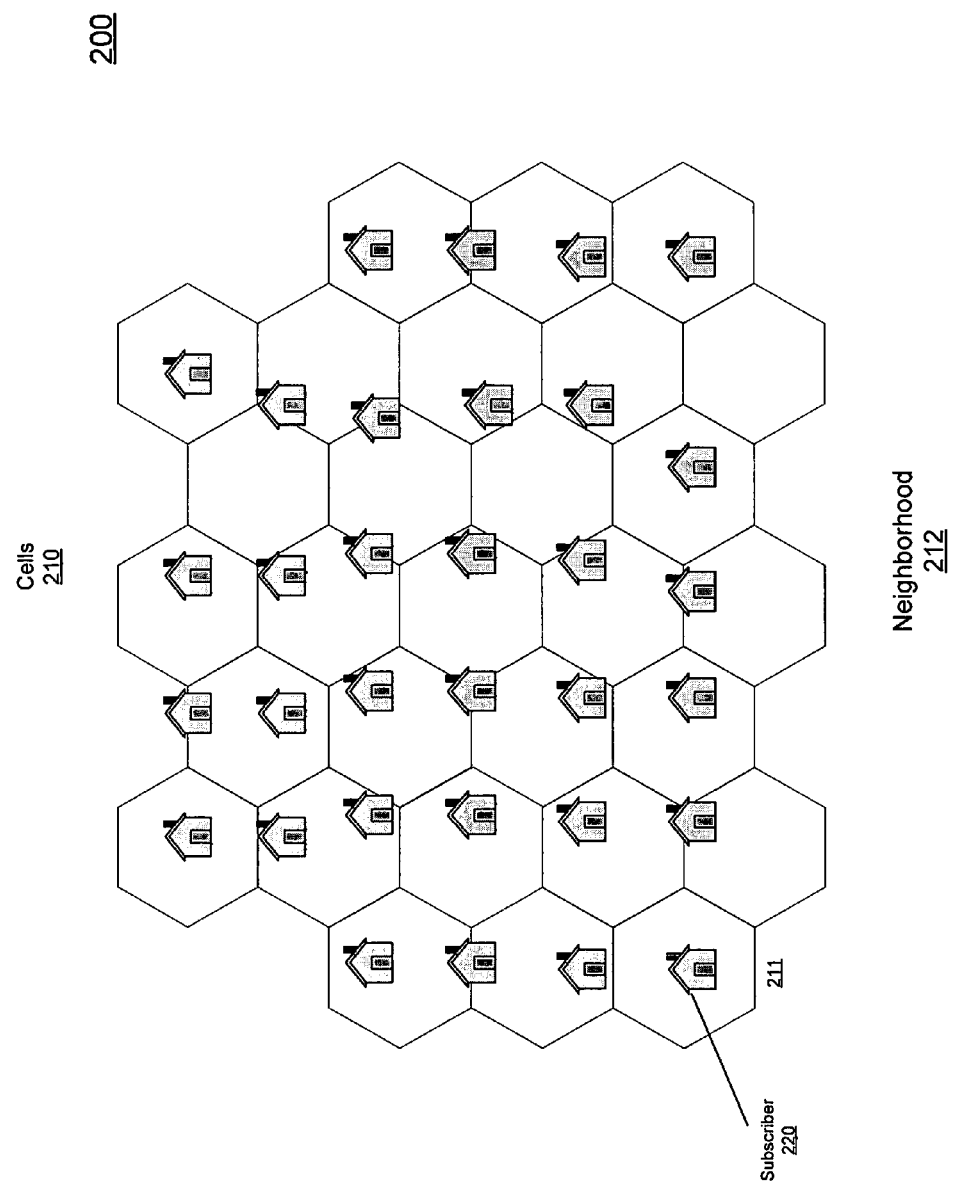
FIG. 2 illustrates a block diagram of an exemplary wireless mesh network, according to one embodiment of the present invention.

FIG. 2 illustrates a block diagram of an exemplary wireless mesh network, according to one embodiment of the present invention. Mesh network 200 may be part of a wireless network, such as neighborhood 212. According to one embodiment, the neighborhood 212 is divided into a number of hexagonal cells 210, where each individual cell 211 includes one or more subscribers 220 to the wireless mesh network 200. The division of the neighborhood 212 is a logical division, and the physical boundaries between cells in network 200 are only representations of the logical network operation. A hexagonal cell 211 may or may not encompass a subscriber 220 because a particular cell may be situated such that no subscribers happen to be located within its area.

According to one embodiment, a subscriber 220 is a computer system authorized to access the neighborhood 212 wireless network 200. A subscriber 220 may be situated in a neighborhood home, in a car, or anywhere within the network coverage area. In addition to the mesh network, it is to be appreciated that other systems employing the various teachings herein may also be used to practice the various aspects of the present invention, and as such, are considered to be within its full scope.

Figure 3:
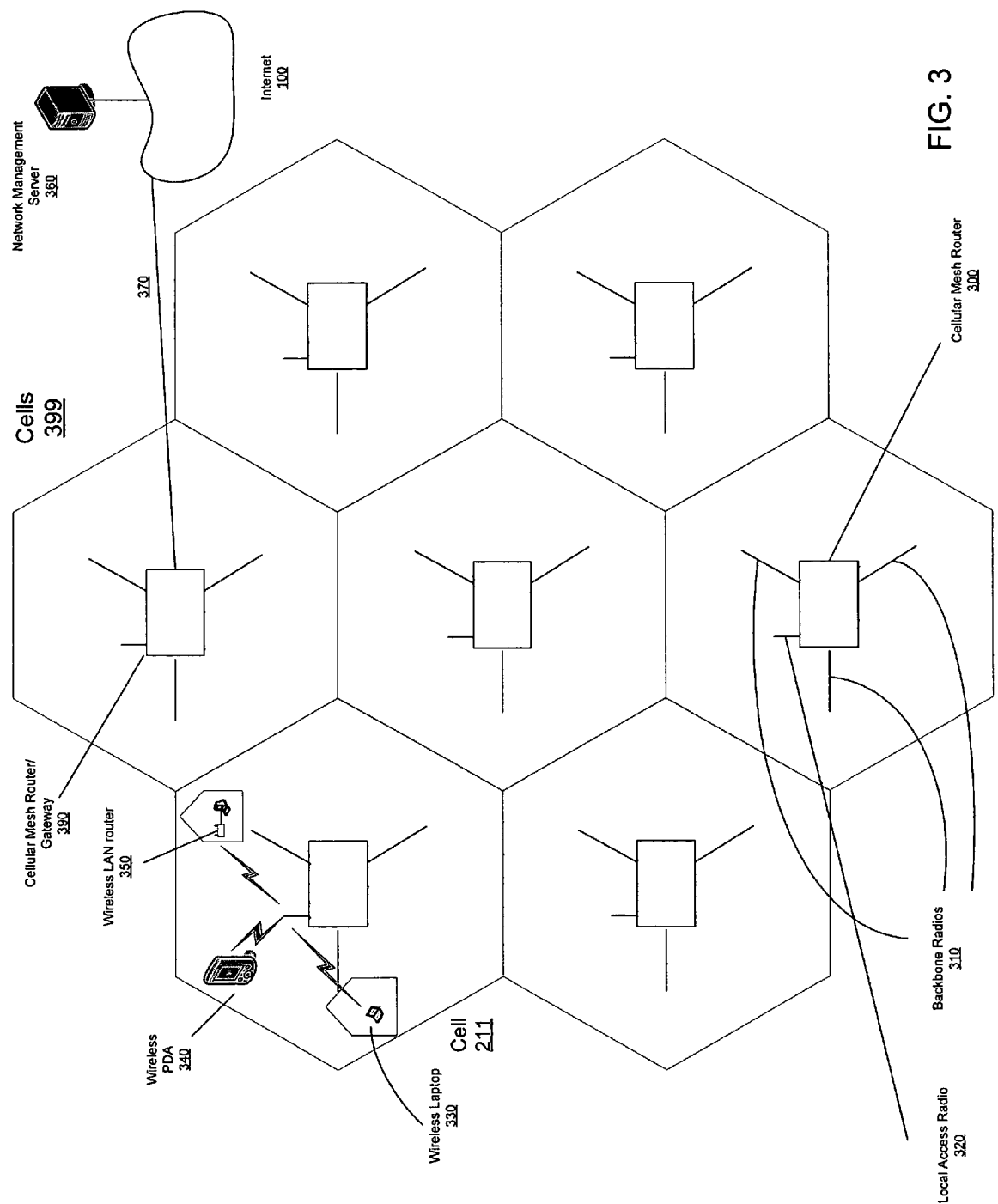
FIG. 3 illustrates a block diagram of multiple hexagonal cells of a mesh network, according to one embodiment of the present invention.

FIG. 3 illustrates a block diagram of multiple hexagonal cells 399 of a mesh network, according to one embodiment of the present invention. Hexagonal cells 399 are a logical network representation and are not meant to define actual physical boundaries. Each cell 211 of the hexagonal cells 399 includes a mesh router 300. A mesh router 300 communicates with exemplary subscribers 330-350. A mesh router 300 may have three backbone radios 310 and one access radio 320. The three backbone radios 310 are used to communicate with other mesh routers. The access radio may be used to communicate with multiple subscribers 330-350. The three backbone radios 310 are assigned three separate channels and the access radio 320 is also assigned a separate channel. One exemplary method of assignment is to use 802.11b/g radios for local access and 802.11a radios for the mesh backhaul. Although a mesh router 300 having three backbone radios 310 and a local access radio 320 have been described, the use of other mesh router configurations is within the scope of the present invention.

A mesh router 300 communicates with subscribers 330-350 through the access radio 320. The subscribers 330-350 need to be setup with subscriber accounts in order to gain access to the mesh network, such as mesh network 200, through a mesh router 300. These subscribers may include a wireless personal digital assistant (PDA) 340, a wireless local area network (LAN) router 350, or a wireless laptop 330. A wireless PDA 340 may include Palm Pilots with wireless capabilities, Blackberrys, or other hand-held device with wireless capabilities. A wireless LAN router 350 may include any network routers that can communicate with a mesh router 300. A wireless laptop 330 may include any computer system with wireless capabilities. Although a wireless PDA 340, a wireless LAN router 350, and a wireless laptop 330 are described, any device with wireless capability may be considered as subscribers.

Mesh routers 300 may also serve as gateways 390 to the Internet 100. According to one embodiment, mesh router/gateway 390 has at least one network interface, such as an ethernet controller that a connection to the Internet 100 via a communications link 370, such as Ethernet. In a mesh network, multiple gateways 390 may exist. Gateway 390 allows mesh routers 300 to access the Internet.

The mesh network topology of FIG. 3 may also include a network management server 360. Network management server 360 may be connected to a gateway 390 through the Internet 100. According to one embodiment, the network management server 360 designates the channel assignments of all mesh routers 300 in the mesh network.

Figure 4:
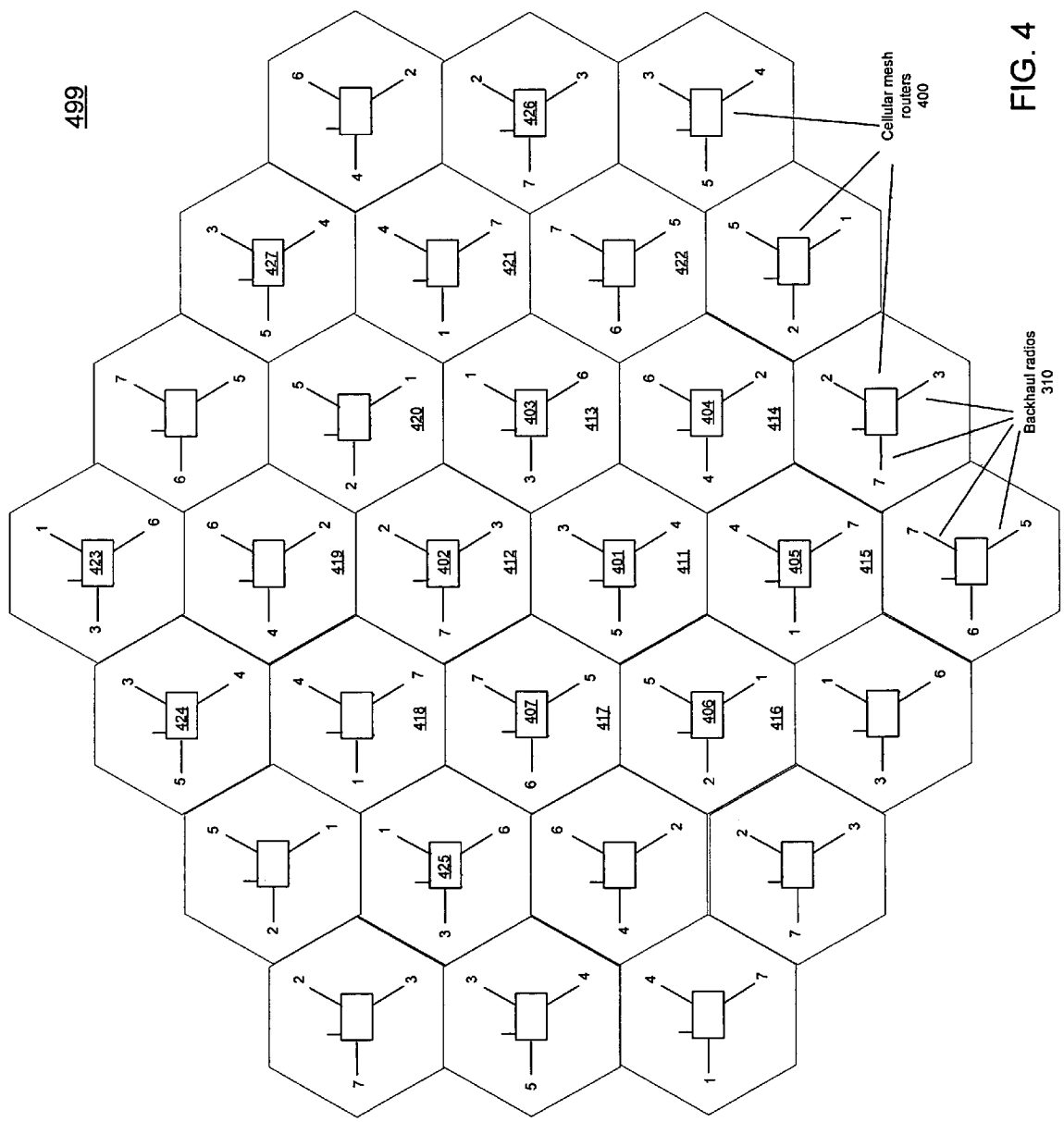
FIG. 4 illustrates a block diagram of a mesh network having multiple hexagonal cells that include channel assignments for mesh routers, according to one embodiment of the present invention.

FIG. 4 illustrates a block diagram of a mesh network 499 having multiple hexagonal cells that include channel assignments for mesh routers 400-407, according to one embodiment of the present invention. Each of the mesh routers 400-407 are assigned three different channels according to the exemplary process described in FIG. 8. Each of the mesh routers 400-407 has three backbone radios 310 which utilize seven non-overlapping frequencies or channels, channels 1-7, throughout the entire mesh network 499. These seven non-overlapping channels provide direct links between all neighboring cells.

For example, cell 411 has six neighbors 412-417. Cell 411 has three backhaul channels (3, 4, 5) used to communicate with the six neighbors 412-417. The channels are assigned to the mesh routers 401-407 such that two neighboring mesh routers have one backhaul radio channel in common. For example neighboring mesh routers 402, 403 have backhaul channel 3 in common with mesh router 401. Channel 3 is the only channel that mesh routers 401-403 have in common. Similarly, channel 4 is the only channel that mesh router 401 has in common with mesh routers 404, 405. And channel 5 is the only channel that mesh router 401 has in common with mesh routers 406, 407.

Each channel is reused in nearby, but not adjacent cells. For each channel, there is a buffer about two cells wide where a channel is not being reused allowing for good separation and low co-channel interference. For example, channel 3 used by mesh routers 401-403 is not used by any mesh routers in neighboring cells 414-422. In other words, it would take two hops before channel 3 is reused. By systematically spacing mesh routers 400 and their channel groups, the available channels are distributed throughout the geographic region 499 and may be reused as many times as necessary so long as the interference between co-channel mesh routers is kept below acceptable levels.

In addition, because mesh routers 400 use three different channels, the mesh backhaul network 499 avoids same-radio packet relay. Because the mesh backhaul network 499 avoids same-radio packet relay, end-to-end throughput does not decrease as the number of mesh routers 400 increases. This allows for the architecture to scale.

According to one embodiment, efficient scaling is supported by configuring each mesh router with three backhaul radios on three different channels, as described above. Assuming that 802.11a radios are used, the throughput of each backhaul radio is up to 54 Mbps. As three neighboring backhaul radios on the same channel consist of a backhaul WLAN and share the bandwidth, the throughput of each backhaul radio is roughly ⅓ of 54 Mbps. As all the same-radio packet relay is completely avoided, the throughput of the relay nodes is not halved and all the traffic, no matter local or remote, will not change the end-to-end throughput available to each mesh router.

For example, the end-to-end backhaul throughput T available to each mesh router is:

$$T = 54 \text{ Mbps} * (\frac{1}{3}) * 3 = 54 \text{ Mbps} \quad (1)$$

Note that in (1), the end-to-end throughput T available to each mesh router is a constant, and is not related to n, the number of nodes in the network. In another word, the end-to-end throughput available to each node is O (1), which simply means that this architecture scales. It should be noted that although IEEE 802.11 based radios are often assumed, the present embodiments of the invention are by no means limited to using 802.11 radios. It is entirely possible that, if found beneficial, other radio technologies can also be used which are highly flexible and radio-agnostic.

The mesh network 499 does not share spectrum for access and backhaul, further improving capacity. If IEEE 802.11 based technology is used, the mesh router 400 could use 802.11b/g radios for local access (e.g., radio 320) and 802.11a radios for mesh backhaul network (e.g., radios 310).

Figure 5:
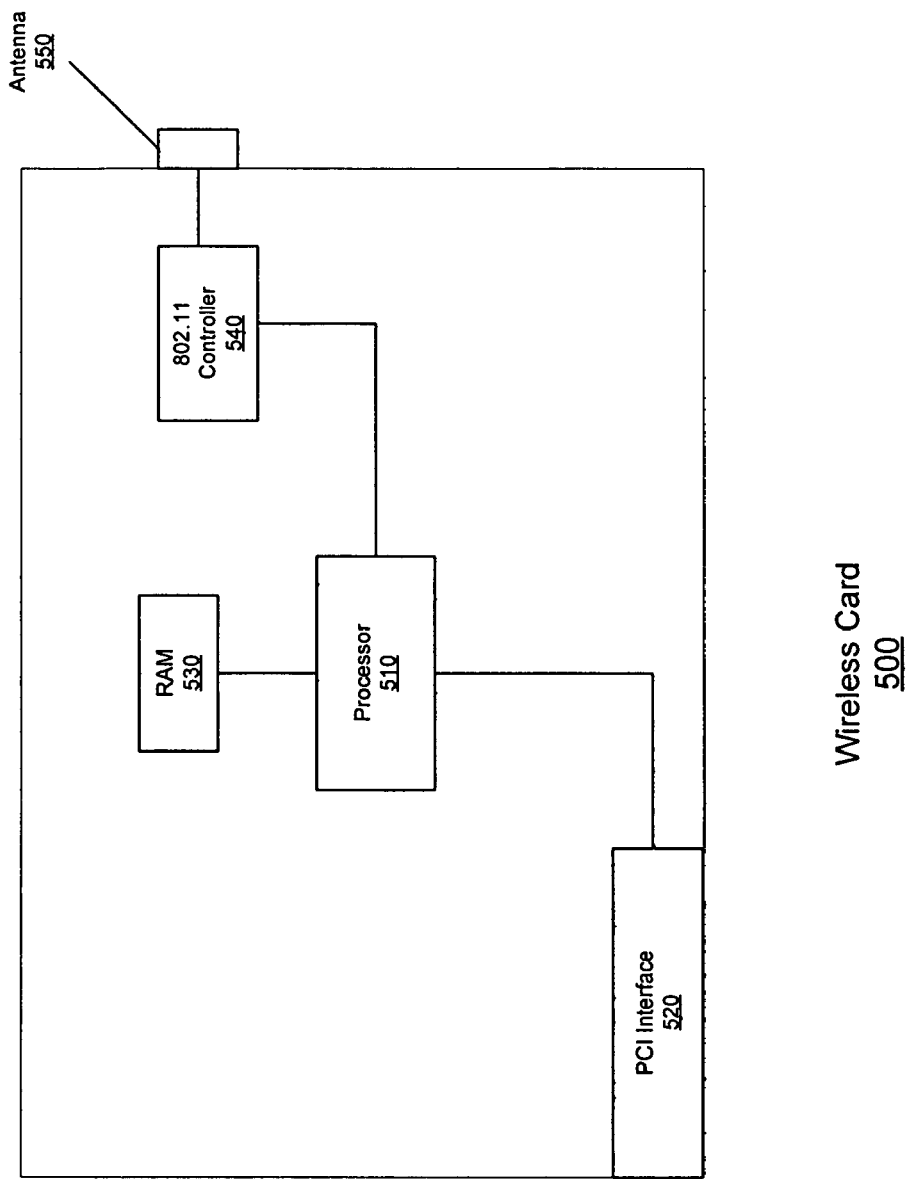
FIG. 5 illustrates a block diagram of an exemplary wireless card, according to one embodiment of the present invention.

FIG. 5 illustrates a block diagram of an exemplary wireless card 500 for use in a mesh network, according to one embodiment of the present invention. Wireless card 500 may be used with a laptop or desktop computer. According to one embodiment, the wireless network card 500 has a peripheral component interconnect (PCI) interface 520 that connects the network card 500 to the computer. The wireless network card 500 also has a processor 510 connected to a random access memory (RAM) module 530 and 802.11 controller 540. The 802.11 controller 540 allows the network card's processor 510 to communicate with the 802.11 antennae 550.

Figure 6:
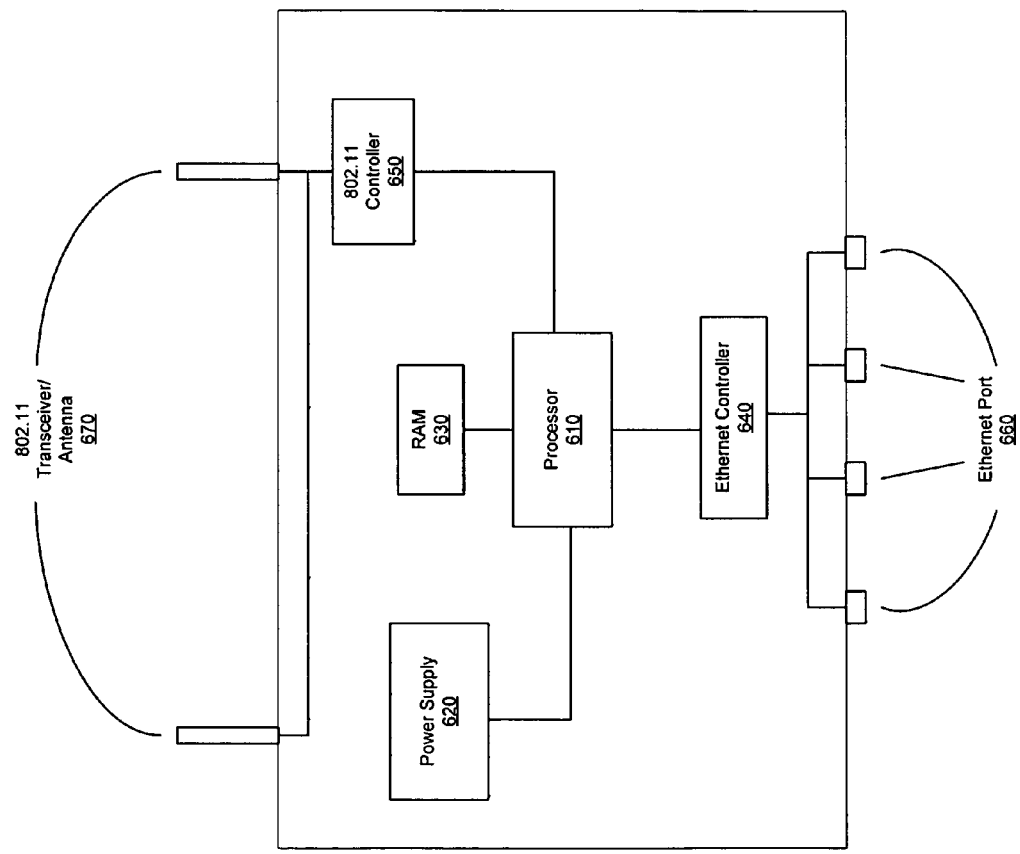
FIG. 6 illustrates a block diagram of an exemplary wireless local area network router used to communicate with a mesh router, according to one embodiment of the present invention.

FIG. 6 illustrates a block diagram of an exemplary wireless router 600, according to one embodiment of the present invention. In FIG. 6, a wireless local area network router 600 allows subscribers to set up their own local area networks. Wireless local area network router 600 may be a Wi-Fi router such as router 350. The wireless local area network router 600 has a processor 610 connected to the power supply 620, random access memory (RAM) module 630, a Ethernet controller 640, and a 802.11 controller 650. The Ethernet controller 640 allows the processor 610 to communicate with Ethernet adapter 660. The 802.11 controller 650 allows the processor 610 to communicate with the 802.11 antennae 670.

Figure 7:
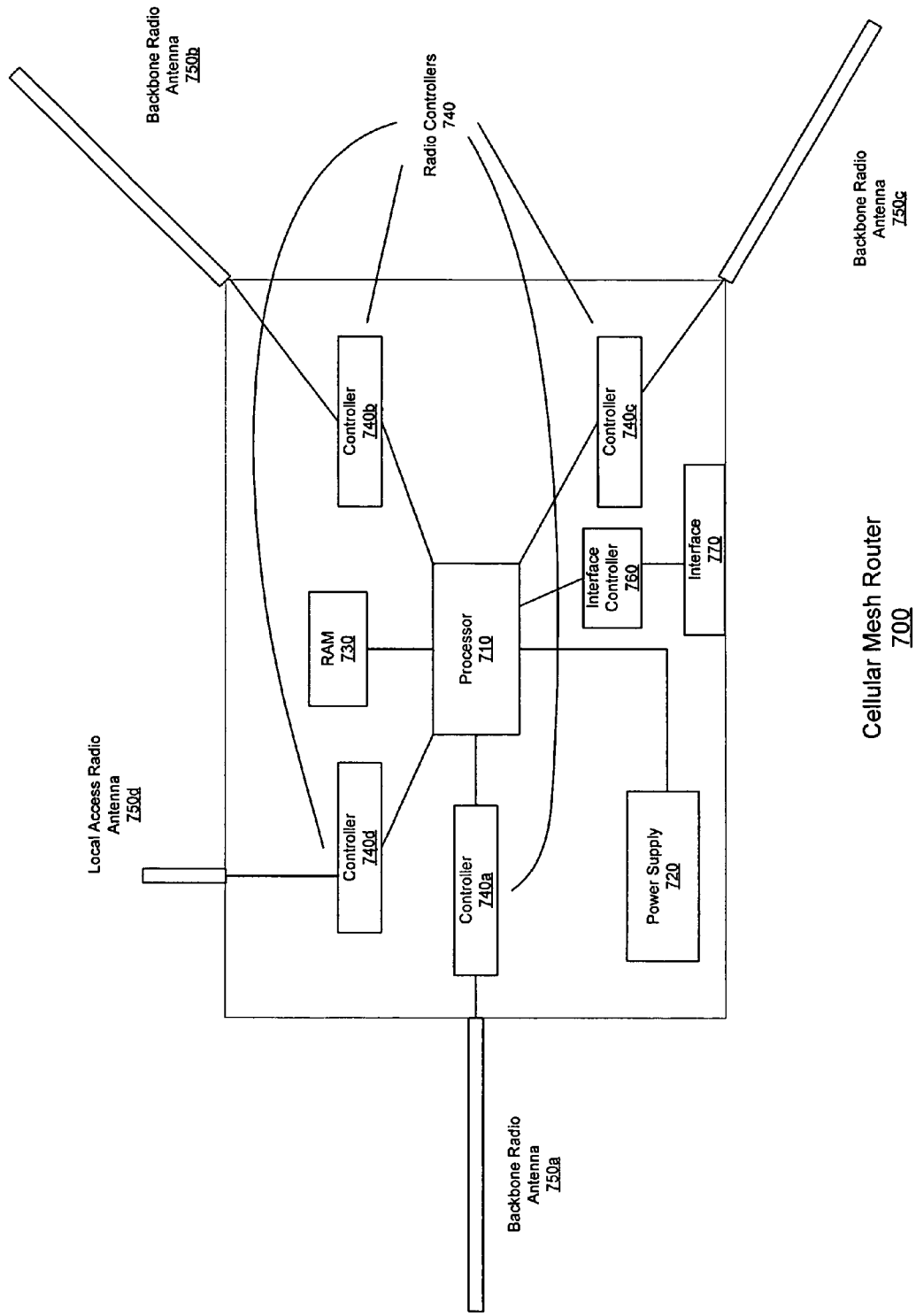
FIG. 7 illustrates a block diagram of an exemplary mesh router, according to one embodiment of the present invention.

FIG. 7 illustrates a block diagram of an exemplary wireless mesh router 700, according to one embodiment of the present invention. In FIG. 7, the mesh router 700 has a processor 710 connected to the power supply 720, random access memory (RAM) module 730, and radio controllers 740. Mesh router 700 may be a mesh router, such as mesh router 300. The radio controllers 740 may include three backhaul radio controllers 740a, 740b, 740c, and one local access radio controller, 740d. Each backhaul radio controller 740a, 740b, 740c allows the processor 710 to communicate with the backhaul radio antennae 750a, 750b, 750c. The mesh router 700 uses 120° sectored directional antennas in order to reduce co-channel interference, according to one embodiment of the present invention. The local access radio controller 740d allows the processor 710 to communicate with the local access radio antenna 750d. Although three radio controllers are described, the mesh router 300 may include more or fewer controllers based on available router technology and the network topology.

According to one embodiment, a mesh router 700 may also include at least one communications interface 770, such as an Ethernet interface, that enables communication with the Internet and act as a gateway 390 for other mesh routers in the network. An interface controller 760 allows the processor 710 to communicate with the interface 770. In alternate embodiments, the communications interface 770 is a wireless communications interface. In addition, components of mesh router 700 may be integrated with each other.

Figure 8:
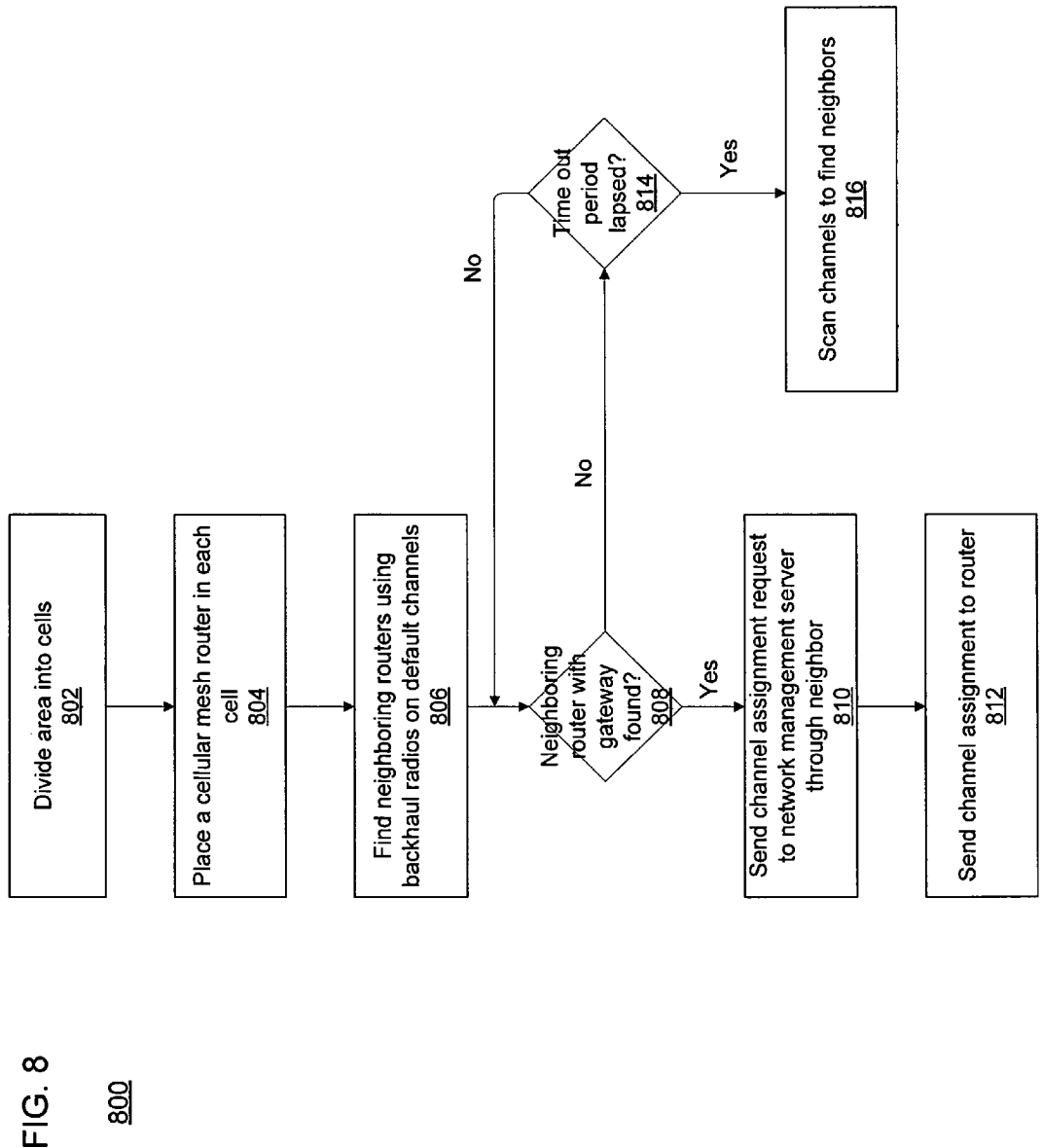
FIG. 8 illustrates a flow diagram of an exemplary process for assigning channels in a mesh network, according to one embodiment of the present invention.

FIG. 8 illustrates a flow diagram of an exemplary process 800 for deploying a mesh network, according to one embodiment of the present invention. In FIG. 8, a network provider may set up a mesh network by first dividing the geographic region for network deployment into cells 210, where the cells may be hexagonal. (802) This division is a logical network representation and is not meant to define actual physical boundaries. At least one mesh router 300 is installed in each hexagonal cell. (804) When a mesh router 700 is first powered up (e.g., before any channels are assigned to it), the mesh router 700 first tries to find neighboring routers using its backhaul radios 750a, 750b, 750c on a default channel. (806)

If any neighboring routers which have a gateway is found (808), the mesh router 700 will send a channel assignment request and its own configuration information to the network management server 360 through that neighbor. (810) The network management server 360 is connected to the gateway 390 and in charge of the channel assignment of the whole network (e.g., mesh network 499). Upon receiving the channel assignment request from the mesh router 700, the network management server 360 uses a simple set of rules and the network topology information stored in its database to decide which channels to assign to that mesh router 700. The network management server 360 then sends the channel assignments to the mesh router 700. (812)

If after a certain timeout period, no neighbors that have a gateway to the network management server 360 can be found using the default channel, the mesh router 700 will automatically start to scan the channels in an attempt to find neighbors that have a gateway 390, and will continue trying until successful. (814) This can happen during incremental deployment. Incremental deployment typically involves situations where a new mesh router is added to a mesh network comprised of mesh routers whose channels have already been assigned by the network management server 360. In this case, it is possible that none of the new mesh router's neighbors uses the default channel. As a result, the new mesh router 700 needs to scan the channels in order to communicate with its neighbors and to find one that has a gateway to the network management server 360.

Figure 9:
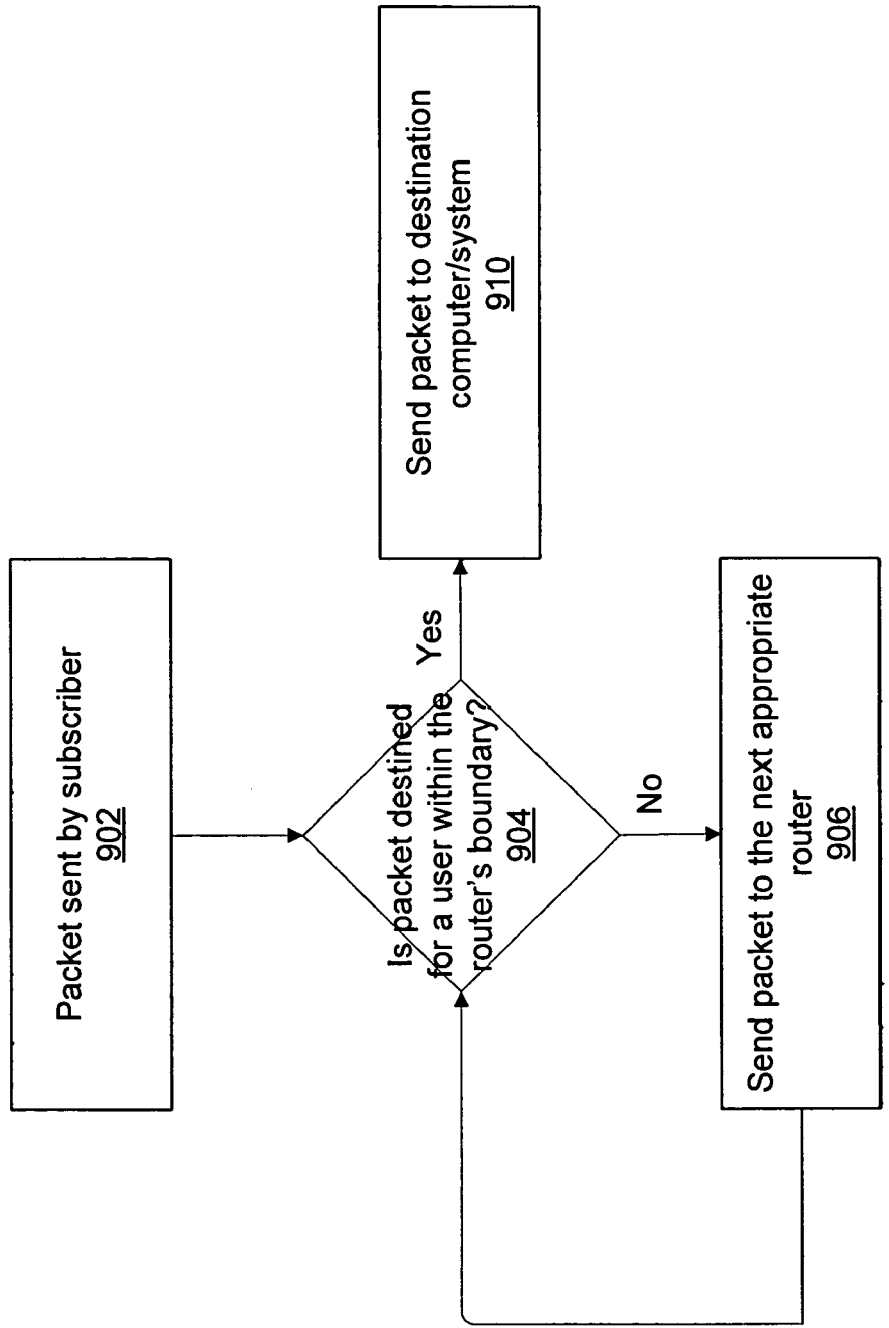
FIG. 9 illustrates a flow diagram of an exemplary network packet flow process, according to one embodiment of the present invention.

FIG. 9 illustrates an exemplary process 900 of how a packet is sent through a mesh network, according to one embodiment of the present invention. In FIG. 9, a packet is sent by a subscriber 220 located in a cell that includes a mesh router, for example mesh router 401. (902) The mesh router 401 receives the packet and decides if the packet is destined for a subscriber within its boundary 411. (904) If so, then the packet is sent to the destination computer or system. (910) If not, then the packet is sent to the next appropriate mesh router in a neighboring cell 412 according to a predetermined routing table. (906) The next mesh router 402 receives the packet and follows the same decision process as the previous mesh router 401. (904)

The present embodiments of a mesh network architecture address many of the problems encountered in deploying prior art wireless mesh network. Some of the benefits of the present mesh network architecture include, but are not limited to, scalability, capacity, cost effectiveness, flexibility, simplicity, and robustness. The present mesh network architecture provides scalability by using multiple radios, utilizing cell-based wide area broadband coverage, and keeping the end-to-end backhaul throughput available to each mesh router at a constant level, i.e., throughput does not decrease as the number of nodes increases. This network capacity is at least an order of magnitude greater than the capacity of prior art mesh networks and is accomplished without requiring any changes to standard 802.11 MAC and hardware. In addition, cost is reduced by minimizing the number of backhaul radios required to deploy a mesh network. In additional embodiments, to further reduce cost, a more compact, simpler mesh router with one access radio and one backhaul radio could be used as an edge node or to terminate the mesh.

A method and system for creating and deploying a mesh network have been disclosed. Although the present methods and systems have been described with respect to specific examples and subsystems, it will be apparent to those of ordinary skill in the art that it is not limited to these specific examples or subsystems but extends to other embodiments as well.

We claim:

1. A computer-implemented method comprising:
   providing a mesh router, wherein the mesh router is used in a cell of a plurality of cells that covers a geographic region, and wherein the mesh router includes three backhaul radios on three different channels and one access radio, the three backhaul radios used to communicate only with other routers and the access radio used to communicate only with subscribers;
   assigning channels to the three backhaul radios of the mesh router wherein the channels are selected from a plurality of channels to allow channel reuse throughout the plurality of cells;
   assigning a common channel of the three different channels to a first neighboring mesh router within a first neighboring cell and a second neighboring mesh router within a second neighboring cell, wherein the first neighboring cell, the second neighboring cell, and the cell are adjacent to one another; and
   assigning additional channels to the first neighboring mesh router and second neighboring mesh router, wherein the additional channels are not the three different channels of the mesh router.

2. The computer-implemented method of claim 1, wherein the mesh router is in a hexagonal cell having six neighboring cells, each neighboring cell has a neighboring mesh router; and wherein the mesh router communicates with the neighboring mesh routers via the three backhaul radios.

3. The computer-implemented method of claim 1 further comprising:
   reusing the common channel in non-adjacent cells, wherein the non-adjacent cells are not adjacent to the first neighboring cell, the second neighboring cell, or the cell.

4. The computer-implemented method of claim 2, wherein the mesh router uses sectored directional antennas.

5. The computer-implemented method of claim 2, wherein the plurality of channels includes seven non-overlapping channels.

6. The computer-implemented method of claim 2, further comprising receiving channel assignments from a network management server; and, wherein assigning channels further comprises scanning for the plurality of channels.

7. The computer-implemented method of claim 2, wherein the geographic area includes edge cells, the edge cells including a simple mesh router having one access radio and one backhaul radio.

8. The computer-implemented method of claim 2, further comprising turning off one or more backhaul radios of the three backhaul radios when the plurality of channels is insufficient to allow channel reuse.

9. A computer-readable medium having stored thereon a plurality of instructions, said plurality of instructions when executed by a computer, cause said computer to perform:
   providing a mesh router, wherein the mesh router is used in a cell of a plurality of cells that covers a geographic region, and wherein the mesh router includes three backhaul radios on three different channels and one access radio, the three backhaul radios used to communicate only with other routers and the access radio used to communicate only with subscribers;

assigning channels to the three backhaul radios of the mesh router wherein the channels are selected from a plurality of channels to allow channel reuse throughout the plurality of cells;

assigning a common channel of the three different channels to a first neighboring mesh router within a first neighboring cell and a second neighboring mesh router within a second neighboring cell, wherein the first neighboring cell, the second neighboring cell, and the cell are adjacent to one another; and assigning additional channels to the first neighboring mesh router and second neighboring mesh router, wherein the additional channels are not the three different channels of the mesh router.

10. The computer-readable medium of claim 9, wherein the mesh router is in a hexagonal cell having six neighboring cells, each neighboring cell has a neighboring mesh router; and wherein the mesh router communicates with the neighboring mesh routers via the three backhaul radios.

11. The computer-readable medium of claim 9 having stored thereon-additional instructions, said additional instructions when executed by a computer, cause said computer to further perform:

reusing the common channel in non-adjacent cells, wherein the non-adjacent cells are not adjacent to the first neighboring cell, the second neighboring cell, or the cell.

12. The computer-readable medium of claim 10, wherein the mesh router uses sectored directional antennas.

13. The computer-readable medium of claim 10, wherein the plurality of channels includes seven non-overlapping channels.

14. The computer-readable medium of claim 10 having stored thereon-additional instructions, said additional instructions when executed by a computer, cause said computer to further perform receiving channel assignments from a network management server; and, wherein assigning channels further comprises scanning for the plurality of channels.

15. The computer-readable medium of claim 10, wherein the geographic area includes edge cells, the edge cells including a simple mesh router having one access radio and one backhaul radio.

16. The computer-readable medium of claim 10 having stored thereon-additional instructions, said additional instructions when executed by a computer, cause said computer to further perform turning off one or more backhaul radios of the three backhaul radios when the plurality of channels is insufficient to allow channel reuse.

17. A network management server, comprising:
a processor;
memory coupled to the processor; and
a bus coupling the processor and memory;
wherein the memory stores instructions that are executed by the processor to assign channels to three radios in a mesh router wherein the channels are selected from a plurality of channels to allow channel reuse throughout a plurality of cells that covers a geographic region, and wherein the mesh router includes three backhaul radios on three different channels and one access radio, the three backhaul radios used to communicate only with other routers and the access radio used to communicate only with subscribers, and wherein the instructions allow the processor to assign a common channel of the three different channels to a first neighboring mesh router within a first neighboring cell and a second neighboring mesh router within a second neighboring cell, wherein the first neighboring cell, the second neighboring cell, and the cell are adjacent to one another, and assign additional channels to the first neighboring mesh router and second neighboring mesh router, wherein the additional channels are not the three different channels of the mesh router.

18. The server of claim 17, wherein the mesh router is in a hexagonal cell having six neighboring cells, each neighboring cell has a neighboring mesh router; and wherein the mesh router communicates with the neighboring mesh routers via the three backhaul radios.

19. The server of claim 17, wherein the instructions allow the processor to reuse the common channel in non-adjacent cells, wherein the non-adjacent cells are not adjacent to the neighboring cell, the second neighboring cell, or the cell.

20. The server of claim 18, wherein the plurality of channels includes seven non-overlapping channels.

21. A mesh router comprising:
a processor;
memory coupled to the processor;
three backhaul radios on three different channels and one access radio, the three backhaul radios used to communicate only with other routers and the access radio used to communicate only with subscribers; and
a bus coupling the processor and memory;
wherein channels are assigned to the three backhaul radios of the mesh router, and the channels are selected from a plurality of channels to allow channel reuse throughout a plurality of cells that covers a geographic region, and wherein the processor assigns a common channel of the three different channels to a first neighboring mesh router within a first neighboring cell and a second neighboring mesh router within a second neighboring cell, wherein the first neighboring cell, the second neighboring cell, and the cell are adjacent to one another, and assigns additional channels to the first neighboring mesh router and second neighboring mesh router, wherein the additional channels are not the three different channels of the mesh router.

22. The server of claim 21, wherein the three backhaul radios existing in a hexagonal cell having six neighboring cells, each neighboring cell has a neighboring mesh router; and wherein the plurality of radios communicate with the neighboring mesh routers via the three backhaul radios.

* * * * *